June 7, 1932.　　　J. C. MARTIN, JR　　　1,861,747
VALVE
Filed Dec. 31, 1927
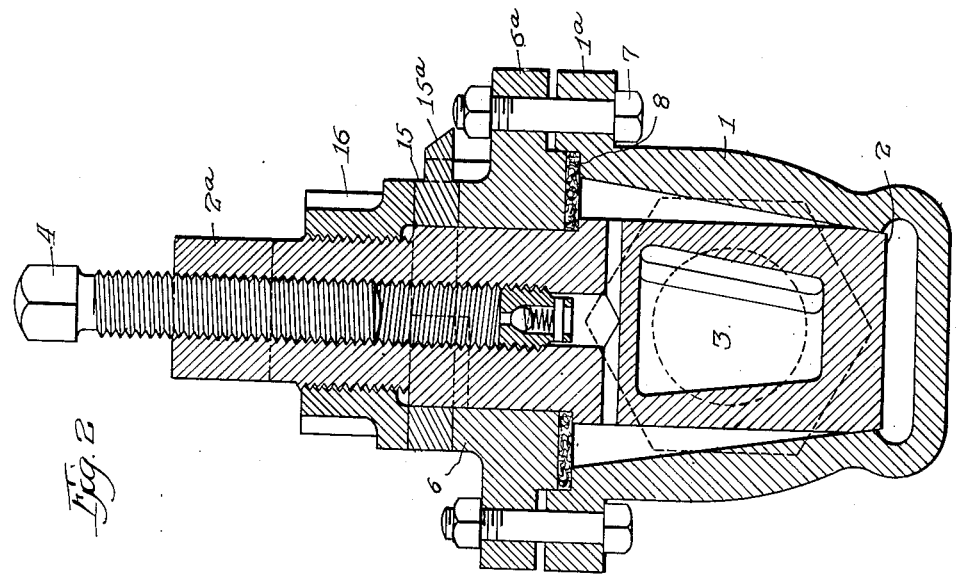
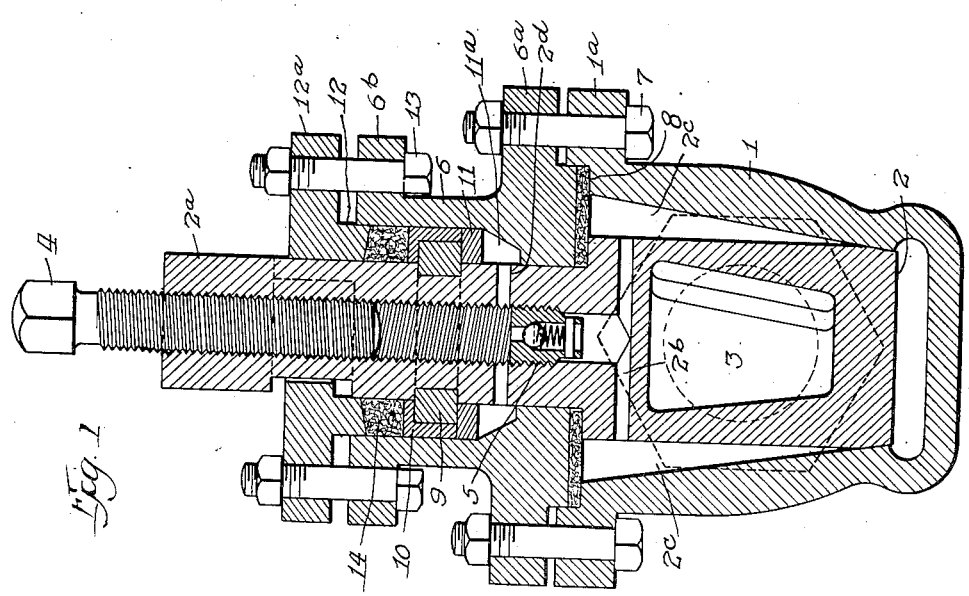
Witness:
Geo. E. Lawson
Inventor:
Jesse C. Martin Jr
by attorney
Paul Carpenter Patented June 7, 1932

1,861,747

UNITED STATES PATENT OFFICE

JESSE C. MARTIN, JR., OF SAN FRANCISCO, CALIFORNIA

VALVE

Application filed December 31, 1927. Serial No. 243,996.

The present invention relates in general to valves and more particularly to valves having a lubricant introduced between the valve member and the valve seat, and has special reference to the provision of an improved type of plug valve of the character referred to, wherein lubricant is employed to prevent sticking of the valve upon its seat and to prevent leakage of fluid therebetween.

Among the more important objects of the present invention are the provision of an improved means for introducing a lubricant into a valve mechanism, particularly, a valve of a well known turning type; the provision of an improved valve structure and lubricating means therefor incorporating therein auxiliary means for lifting the valve from its seat by the action of the lubricant under pressure; the provision of an improved valve structure wherein the passage-ways for lubricating the valve member are of increased area and thus allow for the increase in a supply of lubricant to the surface of contact between the valve and its seat; the provision in a valve having lubricating means, of means auxiliary thereto and operated by said lubricating means for lifting the valve from its seat; and the provision of a valve of the character described which is simple in construction, capable of quick and easy assembly and of low cost to manufacture.

The foregoing and such other objects and advantages as may appear or be pointed out as this description proceeds are attained in the structural embodiments illustrated in the accompanying drawing, in which:

Figure 1 is a vertical sectional view of one form of my invention in which the valve plug is unseated by hydraulic pressure produced underneath a piston carried by the valve stem, and Figure 2 is a vertical sectional view of a second form of my invention in which the valve plug is unseated by a screw-jack arrangement acting on the valve stem.

In each figure the view is taken in a plane along the axis of the valve plug, with the valve in partly open position.

Referring to Figure 1, a valve body or housing 1 is provided with a tapered valve plug 2 having formed therein a valve opening 3. Plug 2 is provided with a stem $2a$ which has a threaded central opening extending from its upper end to a point just above valve passage 3. This threaded opening constitutes a reservoir for a suitable lubricant. Communicating with the lower end of the reservoir is a transverse passage $2b$ passing entirely through plug 2, each end communicating with lubricating grooves $2c$ formed in opposite sides of the plug. The bottom of each groove $2c$ is parallel with the axis of the plug and, therefore, there will be no tendency to unseat the valve by pressure of lubricant in the grooves. A screw 4 is provided as a plunger to force grease or other lubricant from the reservoir into passage $2b$ and grooves $2c$. A check-valve element 5 is removably inserted in the bottom of the reservoir to prevent the flow of lubricant from the valve back into the reservoir when the pressure in the reservoir is relieved.

Surmounting body 1 is a cylindrical sleeve 6 provided at its lower end with a central opening to receive the valve stem $2a$ and counterbored at its upper end to accommodate certain elements to be described. Sleeve 6 is secured to body 1 by suitable bolts 7 passing through flanges $1a$ and $6a$. The upper end of body 1 is counterbored for the reception of a compressible packing washer or disk 8, which is securely clamped between body 1 and sleeve 6 by screws 7 so as to form a fluid tight seal.

A metallic ring 9 is mounted in a groove formed in stem $2a$ and is positioned within the counterbore of sleeve 6. This ring may be divided or made in sections to facilitate its assembly upon the stem. Fitting over ring 9 is a flanged ring 10, which is preferably made solid of metal and is free to turn upon stem 2a and ring 9. Below ring 9 there is also mounted upon stem 2a a third ring 11 which is accurately machined to form a snug fit over stem 2a and within sleeve 6 to prevent the leakage of lubricant.

Immediately below ring 11 is an annular space 11a which I term a compression chamber comprising the lower end of the counterbore in sleeve 6. This annular space 11a communicates with the lubricant reservoir by means of a transverse passage 2d formed in stem 2a above check-valve 5.

A packing ring 14 of compressible resilient material is mounted upon stem 2a above ring 10, the ring 10 forming a suitable seat for the packing ring 14. A packing gland 12 is mounted in the upper end of sleeve 6 and is arranged to exert pressure upon packing ring 14 by means of bolts 13 passing through flanges 6b and 12a. Upon pressure being exerted upon packing 14 it is transmitted to stem 2a by rings 9 and 10, thereby forcing plug 2 tightly in its seat.

In addition to the seating action of packing 14, the packing disk 8 engages the upper end of plug 2 and, when clamped by bolts 7, is compressed, thereby exerting an additional force tending to hold the valve plug on its seat.

When pressure is applied to the lubricant in the reservoir by means of screw 4 to fill the lubricating passages, the annular space 11a will become filled with lubricant, and ring 11, acting as a piston, will exert an upward pressure on ring 9 in opposition to the pressure transmitted by packing 14 and packing 8. By suitable adjustment of the lubricant pressure the plug 2 may be lifted from its seat to permit thorough lubrication of the valve.

The compressible packings 8 and 14 serve to limit the unseating movement of the valve plug so as to prevent any undue leakage of the lubricant. After the valve has been operated several times to ensure a complete wetting of all the surface by the lubricant, the pressure may be relieved and the plug allowed to settle back on its seat.

The lubricating grooves 2c formed in plug 2 do not extend to the lower end of the plug, and, therefore, there is no appreciable leakage of lubricant into the bottom of casing 1; accordingly, substantially the entire unseating force is supplied by the pressure of the lubricant upon piston ring 11. As explained above, the lubricant in grooves 2c cannot supply any unseating force, since the vertical component of the force produced in the grooves acts upon disk 8 and not upon the plug.

The modification shown in Figure 2 is similar in many details to that shown in Figure 1, and like parts are indicated by the same reference numerals. In this arrangement the sleeve 6 is much shorter than in Figure 1 and is not provided with the upper flange. Mounted upon stem 2a, above sleeve 6, is a metal ring 15. This ring is free to slide vertically upon stem 2a, but is secured against rotation by any suitable means such as a pin or spline extending into a vertical slot formed in stem 2a. By this means ring 15 is made to rotate with the stem when the valve is operated. An extension 15a on ring 15 cooperates with suitable stops to limit the movement of the valve to 90°. A portion of the stem 2a extending above ring 15 is threaded to receive a nut 16, which is provided on its lower end with a suitable surface for engaging ring 15.

The arrangement for supplying lubricant to the valve structure in Figure 2 is the same as that shown in Figure 1.

The various elements are so designed that when the compressible packing disk 8 is clamped between housing 1 and sleeve 6 it engages the top of plug 2 surrounding the stem and forces the plug against its seat. To lubricate the valve, nut 16 is screwed down upon ring 15, which rests upon sleeve 6, and is tightened until it causes the plug 2 to unseat against the action of packing disk 8. The lubricant is then forced into the valve by screw 4, and the valve operated several times to ensure a thorough wetting of the entire surface by the lubricant. The nut 16 may then be loosened to permit the plug to be seated again.

It is to be noted that since ring 15 moves with stem 2a when the valve is operated, there is no tendency for the nut 16 to become loosened during operation, as would be the case if the nut engaged sleeve 6 directly.

Having thus described my invention and illustrated its use what I claim as new and desire to secure by Letters Patent is—

1. In a valve structure the combination of a valve housing and a valve element therefor having an operating stem, means for normally holding said valve on its seat, a cylinder mounted upon said housing and surrounding said stem, a piston within said cylinder and secured to said stem, adapted to be acted upon by fluid pressure to lift said valve element from its seat.

2. In a valve structure the combination of a casing and a valve element seated therein, means for supplying lubricant to said valve under pressure, and means external to said casing and operable by the pressure of the lubricant for lifting said valve element from its seat.

3. In a valve structure the combination of a casing and a valve element seated therein, a cover for said casing, a compressible packing clamped between said casing and cover and engaging said valve element to resiliently hold it upon it seat, said valve element being provided with an operating stem passing through said cover, a cylinder surrounding said stem, a piston within said cylinder and secured to said stem, adapted to be acted upon by fluid presure to lift said valve from its seat.

4. In a valve structure the combination of a casing and a valve element seated therein, a cover for said casing, a compressible packing clamped between said casing and cover and engaging said valve element to resiliently hold it upon its seat, said valve element being provided with an operating stem passing through said cover, a cylinder surrounding said stem, a piston within said cylinder and secured to said stem, means for supplying lubricant to said valve under pressure, and a communication from said lubricating means to said cylinder whereby said piston is operated by said lubricant to lift said valve from its seat.

5. In a valve structure the combination of a casing and a valve element seated therein, a cover for said casing, a compressible packing clamped between said casing and cover and engaging said valve element to resiliently hold it upon its seat, said valve element being provided with an operating stem passing through said cover, and fluid pressure operated means mounted in said cover for actuating said stem to lift said valve element from its seat.

6. In a valve structure, the combination of a valve housing having a tapered valve seat, a tapered valve member engaging said seat, means for normally holding the valve on its seat, means for lubricating said valve, comprising a lubricant chamber having pressure creating means therein, said chamber communicating with the surface of contact between the valve and its seat by the provision of lubricant ducts and grooves in said seating surface, said grooves being of a form for eliminating vertical component of pressure therein contained to raise the valve from its seat, and means independent of said lubricating means for unseating said valve to facilitate lubrication.

7. In a valve structure, the combination of a valve housing having a tapered valve seat, a tapered valve member engaging said seat, means for normally holding the valve on its seat, means for lubricating said valve, comprising a lubricant chamber having pressure creating means therein, said chamber communicating with the surface of contact between the valve and its seat by the provision of lubricant ducts and grooves in said seating surface, said grooves being of a form for eliminating vertical component of pressure therein contained to raise the valve from its seat, by reason of said grooves being of greater depth at the larger end of the valve member than at the smaller end thereof.

8. In a valve structure, the combination of a valve housing and a tapered valve element therefor, means for normally holding said valve element upon its seat, means for conducting lubricant under pressure to said valve including passageways for lubricant in the surfaces of contact of the valve and its seat, and said passageways being constructed and formed so that lubricant under pressure therein between the seating surfaces is ineffective to develop a longitudinal component of pressure sufficient to displace the valve relatively to its seat.

In witness whereof I have hereunto signed my name.

JESSE C. MARTIN, Jr.